United States Patent
Yeh et al.

(10) Patent No.: US 12,341,978 B2
(45) Date of Patent: Jun. 24, 2025

(54) IMAGE ARRANGEMENT METHOD AND IMAGE PROCESSING SYSTEM

(71) Applicant: Wistron Corporation, New Taipei (TW)

(72) Inventors: Yu-Chen Yeh, New Taipei (TW); Yen Fu Chen, New Taipei (TW); Min Mao Liu, New Taipei (TW); Kun Te Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 112 days.

(21) Appl. No.: 18/185,402

(22) Filed: Mar. 17, 2023

(65) Prior Publication Data

US 2024/0267538 A1 Aug. 8, 2024

(30) Foreign Application Priority Data

Feb. 8, 2023 (TW) ................. 112104369

(51) Int. Cl.
| | |
|---|---|
| *H04N 19/172* | (2014.01) |
| *G06V 10/70* | (2022.01) |
| *G06V 20/40* | (2022.01) |
| *H04L 51/10* | (2022.01) |

(52) U.S. Cl.
CPC .......... *H04N 19/172* (2014.11); *G06V 10/70* (2022.01); *G06V 20/44* (2022.01); *H04L 51/10* (2013.01)

(58) Field of Classification Search
CPC ......... G06V 20/52; G06V 10/70; G06V 20/00
See application file for complete search history.

(56) References Cited

U.S. PATENT DOCUMENTS

| | | | |
|---|---|---|---|
| 9,065,811 B2 | 6/2015 | Phillips et al. | |
| 9,923,763 B2 | 3/2018 | Phillips et al. | |
| 11,250,054 B1* | 2/2022 | Campbell | ............ G06V 20/588 |
| 2014/0304362 A1 | 10/2014 | Phillips et al. | |
| 2015/0295762 A1 | 10/2015 | Phillips et al. | |
| 2018/0253491 A1* | 9/2018 | Moraleda | ................ G06F 16/71 |
| 2022/0398895 A1* | 12/2022 | Wang | .................. G07F 17/3241 |
| 2024/0298046 A1* | 9/2024 | Laakkonen | ........... G07F 17/326 |

FOREIGN PATENT DOCUMENTS

| | | |
|---|---|---|
| TW | 201501521 X | 1/2015 |
| TW | 201507448 | 2/2015 |

OTHER PUBLICATIONS

"Office Action of Taiwan Counterpart Application", issued on Sep. 12, 2023, p. 1-p. 8.

* cited by examiner

*Primary Examiner* — Kyle M Lotfi
(74) *Attorney, Agent, or Firm* — JCIPRNET (57) ABSTRACT

An image arrangement method and an image processing system are disclosed. In the method, a video stream is decoded into one or more frames of image. The image is buffered in a message queue. The message queue is defined as a first topic. The image in the message queue is transmitted according to a subscribed target of the first topic. Accordingly, the computation burden may be reduced, and the operation efficiency of multiple models may be improved.

20 Claims, 6 Drawing Sheets

IMAGE ARRANGEMENT METHOD AND IMAGE PROCESSING SYSTEM

CROSS-REFERENCE TO RELATED APPLICATION

This application claims the priority benefit of Taiwan application Ser. No. 112104369, filed on Feb. 8, 2023. The entirety of the above-mentioned patent application is hereby incorporated by reference herein and made a part of this specification.

BACKGROUND

Technical Field

The invention relates to an image processing technique related video, and more particularly, to an image arrangement method and an image processing system.

Description of Related Art

At present, artificial intelligence (AI)/deep learning technology may only be applied to solve problems in a single specific field. In addition, platforms/servers that support AI or deep learning have insufficient scalability and configuration flexibility. For example, (edge) computing devices are only used to identify objects in images from a pre-configured specific source but cannot arbitrarily change an image source or object type, and a computing ability limits the number of image sources.

However, in practical application situations, an image recognition platform has the following requirements:
1. Dynamically deploying multiple image recognition models with a specific single function on a single platform, and allowing users to choose any one of the image recognition models.
2. Running the image recognition models at the same time on the single platform.
3. Extensibility of the image source. For example, one platform supports hundreds of cameras.
4. Elasticity of detected items. For example, content of an event to be detected and the cameras may be customized.
5. Detecting events in real time and opportunely issuing alerts.

Therefore, how to construct an image recognition platform that may meet the above requirements at the same time has become one of the problems to be solved in the related field.

SUMMARY

The invention relates to an image arrangement method and an image processing system, which may meet the aforementioned requirements.

An image arrangement method in the embodiment of the invention includes (but is not limited to) following steps. A video stream is decoded into one or more frames of images. The images are buffered in a message queue. The message queue is defined as a first topic. The images in the message queue are transmitted according to a subscribed target of the first topic.

An image processing system in the embodiment of the invention includes (but is not limited to) a memory and a processor. The memory is configured to store a program code. The processor is coupled to the memory. The processor is configured to load the program code to execute decoding a video stream into one or more frames of images, buffering the images in a message queue, defining the message queue as a first topic, and transmitting the images in the message queue according to a subscribed target of the first topic.

Based on the above, according to the image arrangement method and the image processing system of the embodiments of the invention, only one decoding is required for the single video stream, and the decoded image may be sent to the subscribed target who has subscribed to a specific topic. In this way, the image recognition model may obtain the corresponding decoded image as long as it subscribes to the required topic. Not only multiple image recognition models may subscribe to the same topic at the same time, but also the multiple image recognition models may process image recognition tasks in parallel.

In order for the aforementioned features and advantages of the invention to be more comprehensible, several embodiments accompanied with drawings are described in detail as follows.

DESCRIPTION OF THE EMBODIMENTS

Figure 1:
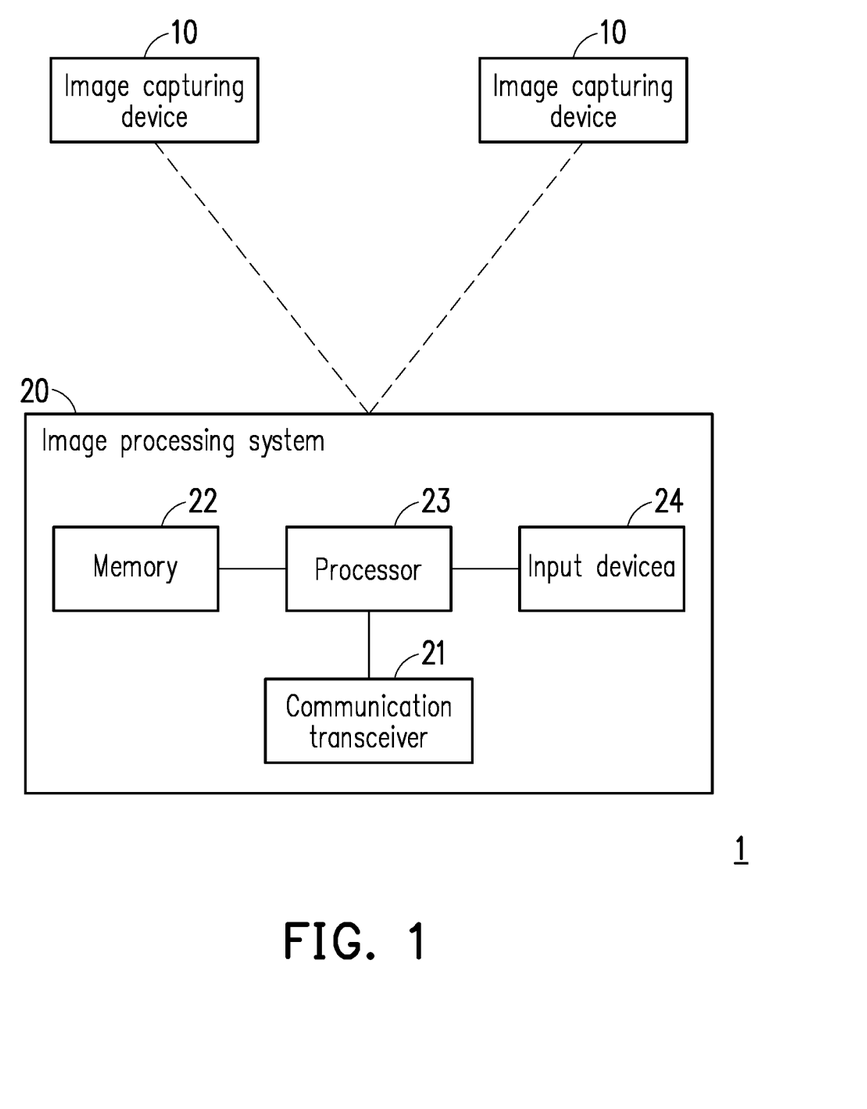
FIG. 1 is a block diagram of components of a system according to an embodiment of the invention.

FIG. 1 is a block diagram of components of a system 1 according to an embodiment of the invention. Referring to FIG. 1, the system 1 includes one or a plurality of image capturing devices 10 and an image processing system 20.

The image capturing device 10 is, for example, a photographic device, a camera, a network camera or a monitor that generates medical images, environmental images, road condition images, business images or working images. In an embodiment, the image capturing device 10 records video and generates a video stream for transmission via a network or a transmission interface. In an embodiment, the video stream may be transmitted to other devices (such as the image processing system 20) through a real-time streaming protocol (RTSP), a real-time transport protocol (RTP), a real-time transport control protocol (RTCP), an HTTP live streaming (HLS) transport protocol. In some embodiments, the image capturing device 10 may be connected to a network through a network access device (for example, a broadband or fiber optic modem, a base station or a router).

The image processing system 20 may be one or a plurality of servers, computer hosts, workstations or edge computing devices.

The image processing system 20 includes (but is not limited to) a communication transceiver 21, a memory 22 and a processor 23.

The communication transceiver 21 may be a communication transceiver circuit or a transmission interface card supporting Wi-Fi, Bluetooth, mobile communication, USB or Ethernet. In an embodiment, the communication transceiver 21 is used to transmit/receive data to/from an external device (for example, the image capturing device 10).

The memory 22 may be any type of fixed or removable random access memory (RAM), read-only memory (ROM), flash memory, conventional hard disk drive (HDD), solid-state drive (SSD) or similar components. In an embodiment, the memory 22 is used to store program codes, software modules, configurations, data or files (for example, images, detection results or lists), which will be described in detail in subsequent embodiments.

The processor 23 is coupled to the communication transceiver 21 and the memory 22. The processor 23 may be a central processing unit (CPU), a graphics processing unit (GPU), or other programmable general purpose or special purpose microprocessor, digital signal processing (DSP), programmable controller, field programmable gate array (FPGA), application-specific integrated circuit (ASIC), neural network accelerator or other similar components or combinations of the above components. In an embodiment, the processor 23 is configured to execute all of or a part of the tasks of the image processing system 20, and may load and execute various program codes, software modules, files and data stored in the memory 22. In some embodiments, multiple processors 23 are configured to implement multiple tasks of the image processing system 20. For example, a motherboard is equipped with multiple graphics cards.

In an embodiment, the image processing system 20 further includes an input device 24. The input device 24 is coupled to the processor 23. The input device 24 may be a mouse, a keyboard, a touch panel or buttons. In an embodiment, the input device 24 is used for receiving a user's input operation (referred to as a user operation hereinafter). For example, a press, click, or swipe operation.

Hereinafter, various devices and components in the system 1 will be used to describe the method of the embodiment of the invention. Each process of the method may be accordingly adjusted according to an actual implementation situation, which is not limited by the invention.

Figure 2:
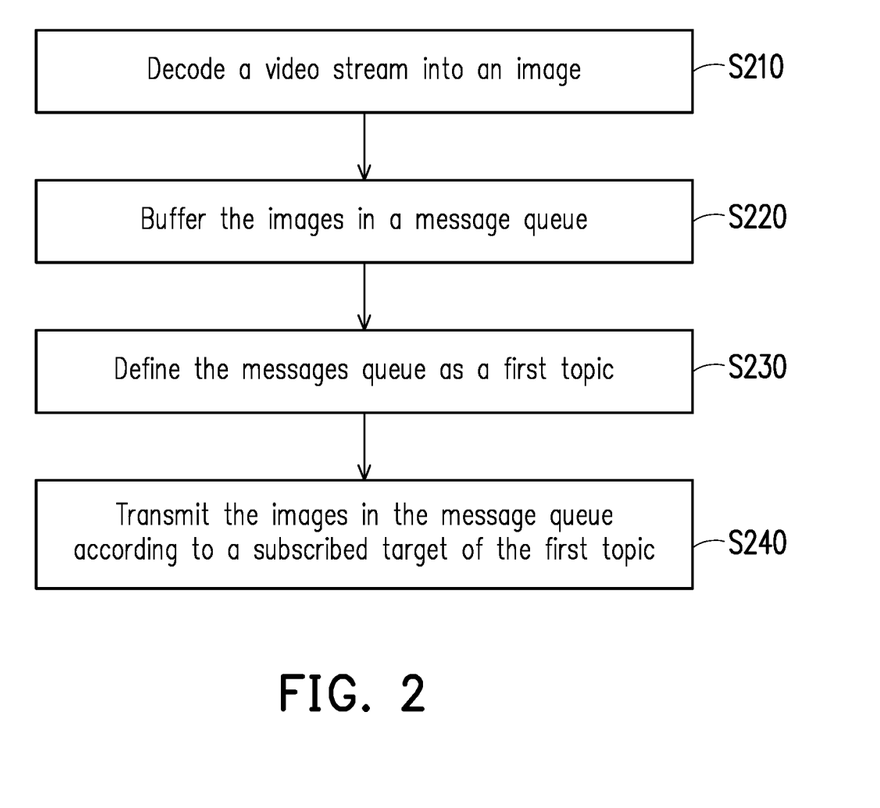
FIG. 2 is a flowchart of an image arrangement method according to an embodiment of the invention.

FIG. 2 is a flowchart of an image arrangement method according to an embodiment of the invention. Referring to FIG. 2, the processor 23 decodes a video stream into one or a plurality of frames of image (step S210). To be specific, the video stream may come from the image capturing device 10. An installation environment of the image capturing device 10 is, for example, a store, a station, a public transportation vehicle, an intersection, an office, a bank, or a government agency, which is not limited by the invention.

In some embodiments, depending on different refresh rates or frame rates, the video stream may include multiple frames of still image/picture per second.

In order to transmit the video stream through a network or transmission interface, the video stream may be encapsulated into packets or messages together with control information/headers (for example, destination information, protocol type, or encoding method). Alternatively, in order to reduce an amount of data to be transmitted, the video stream may be encoded into an image encoding format by a processor in the image capturing device 10, and then transmit the transport protocol and/or the image encoding format of the video stream. In an embodiment, based on the transmission protocol and/or image encoding format of the video stream, the processor 23 may decode the video stream through a corresponding decoder, and obtain one or more frames of image in the video stream accordingly. For example, the decoder obtains one or more frames of image from an RSTP stream.

In an embodiment, the processor 23 decodes another video stream from another image capturing device 10 into one or more frames of another image through another decoder. Namely, for video streams of different image capturing device 10, the processor 23 decodes these video streams through different decoders.

It should be noted that in some application situations, there may be various subsequent analysis requirements (for example, object detection or event detection) on the video stream from one image capturing device 10. Therefore, the following problem may be faced.

Figure 3A:
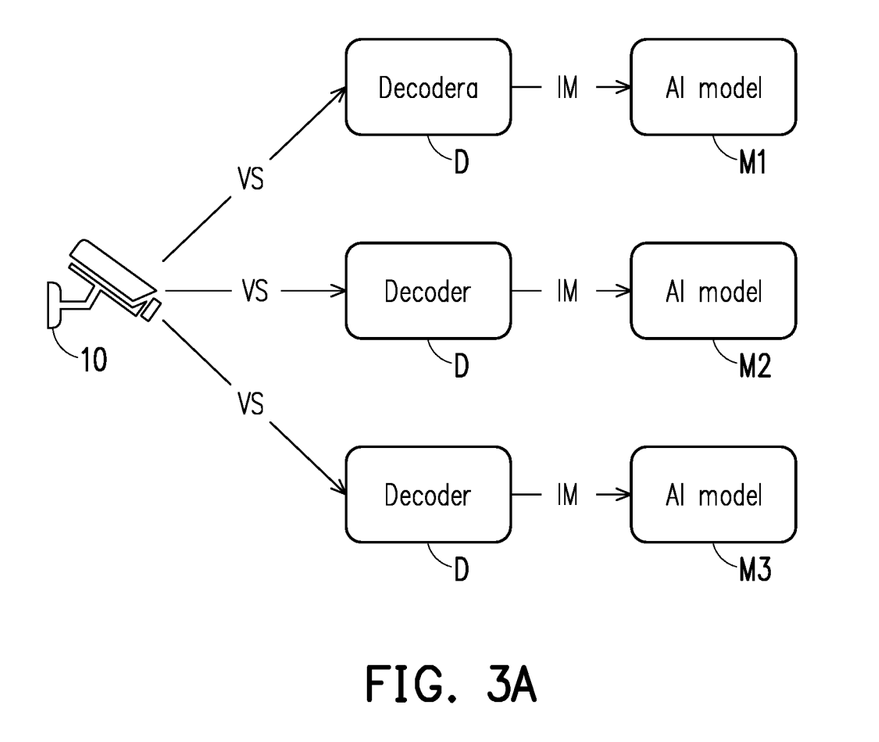
FIG. 3A is a schematic diagram illustrating a situation of a multi-video stream.

FIG. 3A is a schematic diagram illustrating a situation of a multi-video stream. Referring to FIG. 3A, a single image capturing device 10 provides multiple sets of video streams VS to multiple AI modules M for image recognition. However, the number of the video streams VS that may be provided by the image capturing device 10 may be limited (for example, the image capturing device 10 may only provide 3 video streams VS at most), so it is difficult to increase the number of the AI modules M arbitrarily. In addition, the server needs to be configured with the same number of decoders D to respectively decode the video streams VS to obtain images IM for the AI modules M to analyze. Namely, a single server may need to perform image decoding by multiple times, thereby causing a computational burden.

Figure 3B:
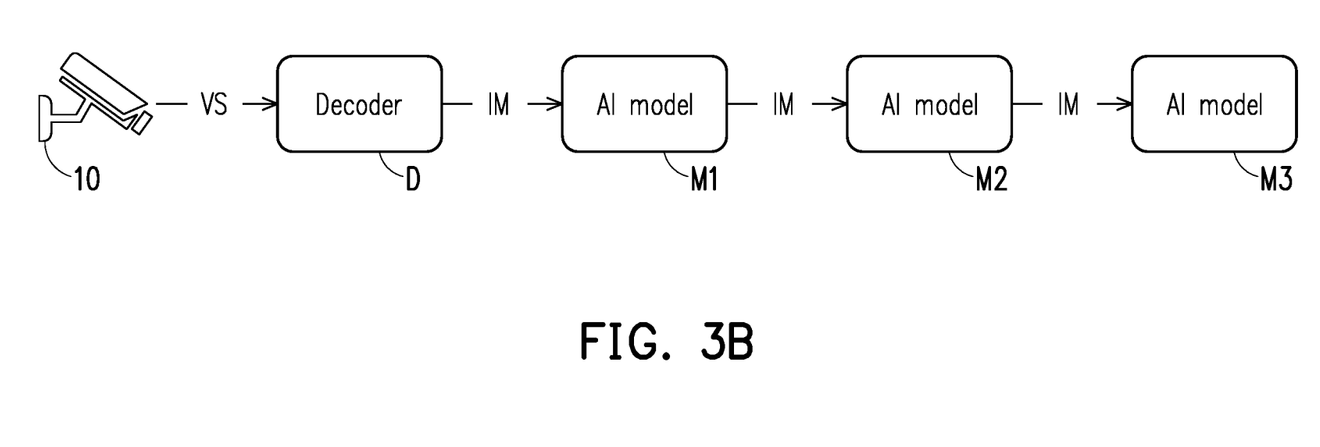
FIG. 3B is a schematic diagram illustrating a situation of model concatenation.

In addition, FIG. 3B is a schematic diagram illustrating a situation of model concatenation. Referring to FIG. 3B, if multiple AI models M1-M3 are connected in series in a pipeline manner, where the AI models M1-M3 are AI models with different functions. Although only a single decoder D is needed, the image IM will pass through each of the AI models M1-M3, thereby accumulating an overall recognition time, which makes the AI model ranked behind (for example, the AI model M3) unable to provide real-time recognition.

Therefore, there is a need to propose a solution to the above-mentioned problem.

Referring to FIG. 2, the processor 23 buffers the one or plurality of frames of image in a message queue (step S220). Specifically, the message queue (or referred to as an image queue) is a register/buffer for temporarily storing images. The message queue has a publish-subscribe (Pub-Sub) feature. A publish-subscribe mode is to send messages to different types of consumers (referred to as subscribed targets hereinafter, such as applications or recognition models that receive messages/images). A producer may publish messages/images to a message queue server/service (for example, Apache Pulsar or RabbitMQ). The message queue server/service performs queuing of messages/images and waits for subscribed targets to subscribe. Therefore, the processor 23 may queue images corresponding to one image capturing device 10 for distributing to one or more subscribed targets (for example, event detectors or object classifiers).

It should be noted that the number of message queues or the number of images in the message queues may be changed according to actual needs, which are not limited by the embodiment of the invention.

Referring to FIG. 2, the processor 23 defines the message queue as a first topic (step S230). Specifically, in the publish-subscribe mode, one or more subscribed targets may subscribe to a specific topic. In the embodiment of the invention, each topic corresponds to a message queue, and also corresponds to a video stream or a decoded image of a single image capturing device 10. Another topic (for example, a second topic or a third topic) corresponds to another message queue, and also corresponds to a video stream or a decoded image of another image capturing device 10.

In an embodiment, the processor 23 may define the aforementioned decoder used for decoding the video stream as a producer of the first topic, and publish the images converted from the video stream to the message queue server/service through the publisher (executed by the processor 23). The message queue server/service may publish the images converted from the video stream to the message queue, and then accordingly buffer the images in the message queue.

Referring to FIG. 2, the processor 23 transmits one or more frames of the images in the message queue according to the subscribed target of the first topic (step S240). Specifically, in response to the fact that the first topic has a subscribed target, the processor 23 may transmit the images in the message queue corresponding to the first topic to the subscribed target. In an embodiment, the processor 23 broadcasts the images in the message queue to all subscribed targets through the message queue server/service.

In an embodiment, the processor 23 may set an event detector corresponding to the subscribed target. Event detector may be used to detect one or more events in image content, i.e., to perform event detection to detect, for example, a car accident, possession of a weapon, or a fall. However, event content may still be changed according to actual needs, for example, for the following application situations: under-vehicle equipment detection of MRT (mass rapid transit) machinery factory, station gate monitoring, personnel monitoring, road monitoring, technology law enforcement, factory safety monitoring or production line detection.

In an embodiment, the processor 23 or other devices may train the event detector (which may be regarded as an inference model) through a machine learning algorithm. The machine learning algorithm is, for example, a neural network, a decision tree, YOLO (you only look once) or a random forest, but the invention is not limited thereto. The machine learning algorithm may analyse training samples to obtain patterns there from, so as to predict unknown data through the patterns. For example, the event detector establishes an association between multiple nodes in a hidden layer between feature data (i.e., an input of a model) and the event (i.e., an output of the model) according to the marked samples (for example, feature data of holding weapons, fires, regulatory violations, or equipment anomalies). The event detector is a model constructed after learning, and may make inferences on the data to be evaluated (for example, images or image features). In the embodiment of the invention, the machine learning algorithm may establish an association between the input image and the event.

In other embodiments, the event detector may also adopt an image feature comparison mechanism. In some embodiments, the subscribed targets may also be applications or software modules related to object detection, image processing or other image analysis/processing.

In an embodiment, the processor 23 may receive one or more frames of images in the message queue through the event detector, and publish images to subscribed targets through the message queue server/service as mentioned above. Then, the processor 23 may detect events in the image content of one or more frames of images through the event detector.

In an embodiment, the processor 23 may set another event detector corresponding to the subscribed targets. Since the number of subscribed targets of the single topic in the publish-subscribe mode is not limited to one, the processor 23 may add subscribed targets according to requirements. Namely, the subscribed target of the single topic may be one or plural. The event to be detected by the other event detector may be different from the event to be detected by the aforementioned event detector. For example, one event detector is used to recognize a gangster face, and another event detector is used to recognize a running state of an MRT vehicle or a gate opening/closing state. Therefore, the processor 23 may receive the images in the same message queue as another event detector through the event detector, and detect corresponding events accordingly.

In an embodiment, the processor 23 may broadcast the images of the first topic to the event detector and the another event detector subscribing to the first topic through the message queue server/service. Similarly, if there are more event detectors or other types of subscribed targets, the images may be broadcasted to all subscribed targets. These event detectors may all share the same video stream, and different event detectors may perform event detection at the same time.

In an embodiment, the processor 23 may receive a setting operation on a user interface through the input device 24. The setting operation is used to set the subscribed targets of the first topic. The processor 23 may add or delete the subscribed targets of the first topic according to the setting operation. For example, the user interface provides a menu of event detectors, and the setting operation is used to select a specific event detector. The event detector changed from unselected to selected is the subscribed target to be deleted, and the event detector changed from selected to unselected is the subscribed target to be added. In this way, a dynamic and flexible adjustment mechanism may be provided.

In an embodiment, the processor 23 may activate the event detector in a container system. Platforms such as Docker, LXC (Linux Containers), Solaris Containers, etc., provide operating-system-level virtualization technology, and package program codes, libraries, and environment configuration files required by the application into a container. Therefore, host resources may be configured and specific application may be run on the container without installing an additional guest operating system on a host operating system (OS). The event detector is the application running on the container.

In other embodiments, the event detector or other subscribed targets may also be applications or software modules running on other systems.

In addition to the video stream from one image capturing device 10, the image processing system 20 may also process video streams of more image capturing device 10.

In an embodiment, the processor 23 may decode another video stream from another image capturing device 10 or other image sources into one or more frames of another image. The description of decoding the another video stream may be deduced by referring to step S210 in FIG. 2, and detail thereof is not repeated here. The processor 23 may buffer one or more frames of another image in another message queue (different from the message queue described in step S220). The description of buffering images may be deduced by referring to step S220 in FIG. 2, and detail thereof is not repeated here. The processor 23 may define the another message queue as a second topic (different from the first topic described in step S230). The description of defining the topic may be deduced by referring to step S230 in FIG. 2, and detail thereof is not repeated here. Then, the processor 23 may transmit the another image (different from the image described in step S240) in another message queue according to another subscribed target of the second topic. The description of image transmission may be deduced by referring to step S240 in FIG. 2, and detail thereof is not repeated here.

Namely, the message queue server/service may manage multiple topics. These topics distinguish different message queues and thereby distinguish images of different video streams.

In an embodiment, the processor 23 may provide device management of the image capturing device 10. Each image capturing device 10 has unique identification information. The topic may be named according to the identification information of the image capturing device 10. However, the naming of topics may still be changed according to actual needs, and is not limited by the embodiments of the invention.

In order to facilitate the understanding of the inventive spirit of the embodiments of the invention, application situations are described below.

Figure 4:
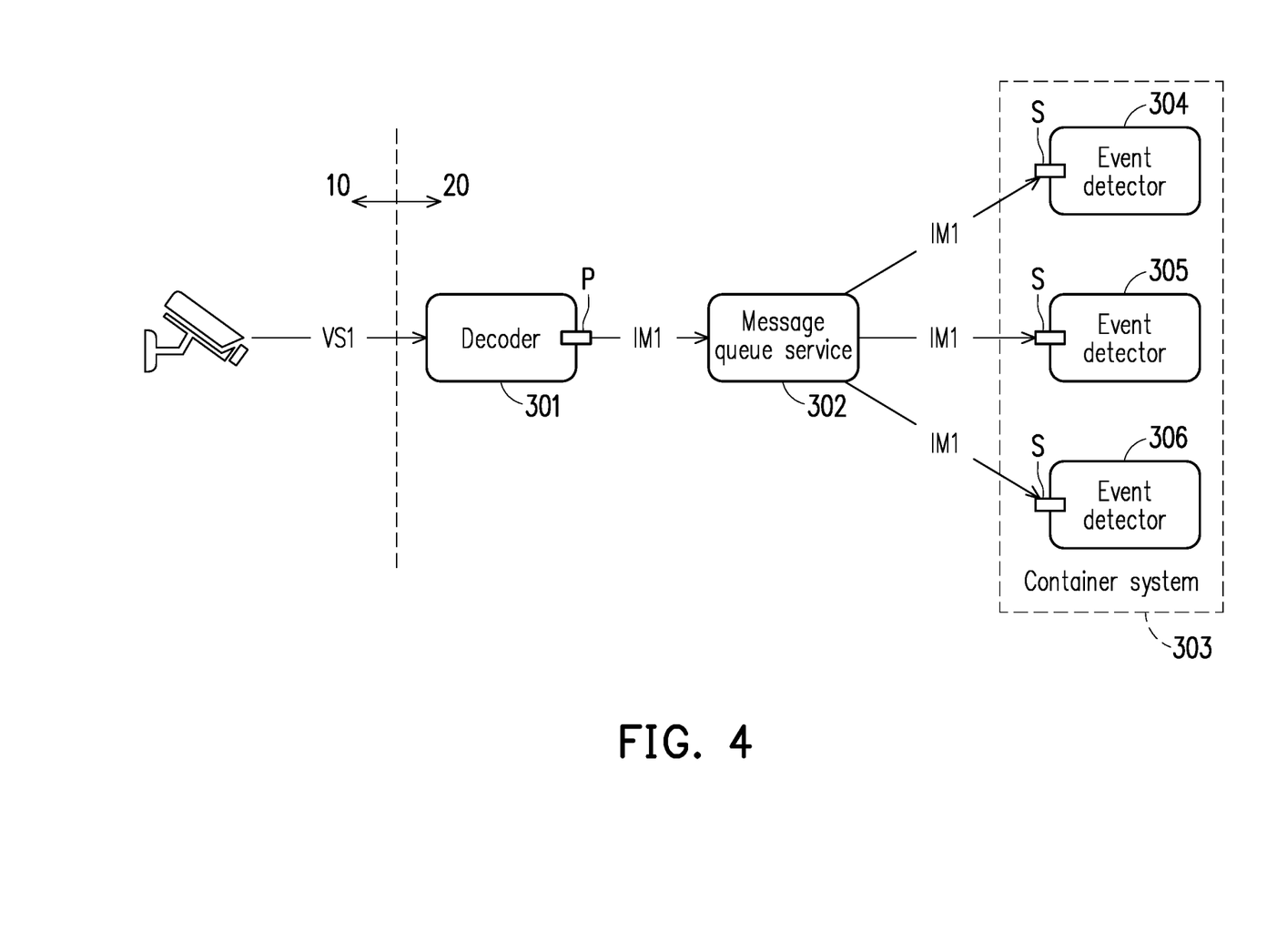
FIG. 4 is a schematic diagram illustrating a situation of a single video stream according to an embodiment of the invention.

FIG. 4 is a schematic diagram illustrating a situation of a single video stream according to an embodiment of the invention. Referring to FIG. 4, it is assumed that the image capturing device 10 captures a first platform in an MRT station. The processor 23 executes a decoder 301, a message queue service 302 and a container system 303. In an embodiment, the container system 303 may be implemented by a buffer area of a storage device, a register, a server or other systems with a storage function.

Moreover, the processor 23 executes event detectors 304, 305, 306 in the container system 303. In an embodiment, the respective functions of the event detectors 304, 305, 306 are different. It is assumed that the event detector 304 is used to detect a weirdo holding a watermelon knife, the event detector 305 is used to detect a gate opening/closing state, and the event detector 306 is used to detect a running state of the MRT vehicle.

In an embodiment, the decoder 301 decodes a video stream VS1 coming from the image capturing device 10 into one or more frames of image IM1, and distributes the image IM1 (serving as a publisher P). The message queue service 302 buffers the image IM1 in the message queue. The processor 23 defines the message queue as a third topic. In response to the fact that the event detectors 304, 305, and 306 (serving as subscribed targets S) all subscribe to the third topic, the message queue service 302 broadcasts the image IM1 to the event detectors 304, 305, and 306. Therefore, the detection of the weirdo holding the watermelon knife on the first platform of the MRT station, the gate opening/closing state and the running state of the MRT vehicle may be simultaneously implemented in real time. In addition, the same video stream VS1 may be provided to multiple event detectors (such as the event detectors 304, 305, 306) for usage only by decoding once.

Figure 5:
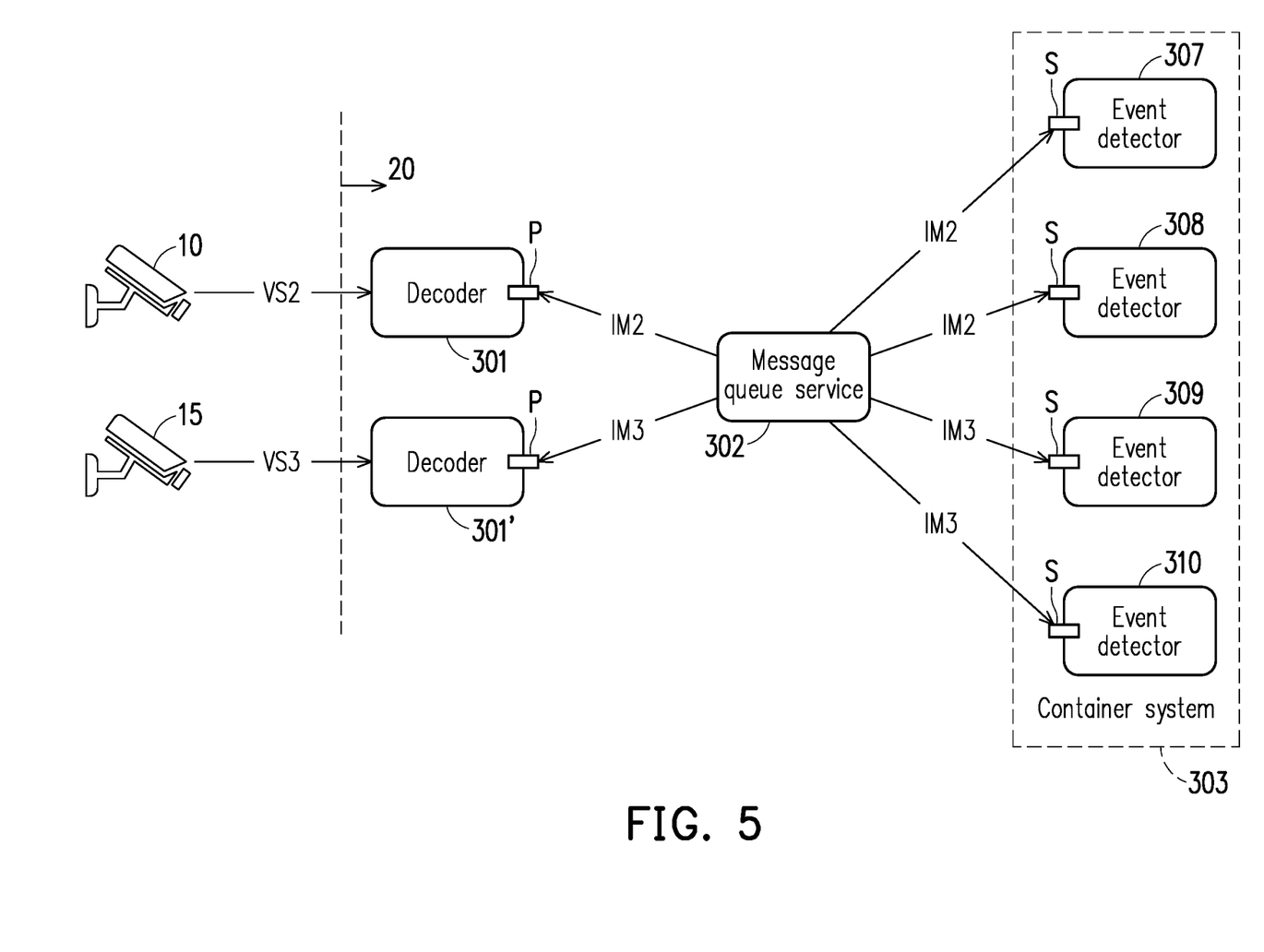
FIG. 5 is a schematic diagram illustrating a situation of a multi-video stream according to an embodiment of the invention.

FIG. 5 is a schematic diagram illustrating a situation of a multi-video stream according to an embodiment of the invention. Referring to FIG. 5 it is assumed that two image capturing devices 10 and 15 respectively photograph the first platform and a second platform in the MRT station. The processor 23 executes the decoder 301, the message queue service 302 and the container system 303. In addition, the processor 23 executes event detectors 307, 308, 309, 310 in the container system 303. It is assumed that the event detector 307 is used to detect the weirdo holding the watermelon knife, the event detector 308 is used to detect the gate opening/closing state, the event detector 309 is used to detect the running state of the MRT vehicle, and the event detector 310 is used to detect the weirdo holding the watermelon knife. The two decoders 301, 301' respectively decode video streams VS2, VS3 coming from the different image capturing devices 10, 15 into one or more frames of images IM2, IM3. Where, when the user interface receives the same AI model that needs to be opened with two containers (for example, the AI model for detecting the weirdo holding the watermelon knife), the AI model for this function will be opened (such as executing the event detector 307, 310). The message queue service 302 buffers the images IM2 and IM3 in two message queues. The processor 23 respectively defines the two message queues as a fourth topic and a fifth topic. In response to the event detectors 307, 308 both subscribing to the fourth topic, the message queue service 302 broadcasts the image IM2 to the event detectors 307, 308. Therefore, the detection of the weirdo holding the watermelon knife on the first platform in the MRT station, and the gate opening/closing state may be simultaneously implemented in real time. Furthermore, in response to the event detectors 309, 310 both subscribing to the fifth topic, the message queue service 302 broadcasts the image IM3 to the event detectors 309, 310. Therefore, the detection of the weirdo holding the watermelon knife on the second platform in the MRT station and the running state of the MRT vehicle may be simultaneously implemented in real time.

In summary, in the image arrangement method and image processing system of the embodiment of the invention, based on the publish-subscribe feature of the message queue, only one decoding is required for the single video stream, and the image may be sent to all of the subscribed targets at the same time. In this way, a computation load may be reduced, and the efficiency of multi-model identification may also be improved. The corresponding relationship between the topic and the subscribed target in the embodiment of the invention does not need to be set in advance, but is set by the user's dynamic deployment operation at any time according to the demand during the operation of the system (for example, adding an AI model or assigning the topic corresponding to the AI model according to the demand). In this way, the image arrangement method and image processing system in the embodiments of the invention are not only more real-time and more efficient, by dynamically increasing or decreasing the AI models or assigning the topics corresponding to the AI models at any time, the effect of saving labor costs is also achieved. In addition, the embodiments of the invention may also be applied in environments such as public transport stations, roads, factories etc.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An image arrangement method, comprising:
    decoding a video stream into at least one frame of image;
    buffering the at least one frame of image in a message queue;
    defining the message queue as a first topic, wherein the message queue queues the at least one frame of image and waits for a subscribed target to subscribe the first topic;

setting an event detector corresponding to the subscribed target of the first topic, and setting another event detector corresponding to the subscribed target of the first topic, wherein an event detected by the event detector is different from an event detected by the another event detector; and transmitting the at least one frame of image in the message queue to the event detector and the another event detector at the same time in response to the subscribed target subscribing the first topic.

2. The image arrangement method according to claim 1, further comprising:

defining a decoder as a producer of the first topic; wherein the decoder is used to decode the video stream; and publishing the at least one frame of image converted from the video stream to the message queue.

3. The image arrangement method according to claim 1, further comprising:

receiving the at least one frame of image in the message queue through the event detector; and detecting the event in image content of the at least one frame of image by the event detector.

4. The image arrangement method according to claim 3, wherein detecting the event in the image content of the at least one frame of image by the event detector comprises:

training the event detector by a machine learning algorithm; wherein the machine learning algorithm establishes an association between an input image and the event.

5. The image arrangement method according to claim 3, further comprising:

receiving the at least one frame of image in the message queue through the another event detector.

6. The image arrangement method according to claim 5, wherein transmitting the at least one frame of image in the message queue according to the subscribed target of the first topic comprises:

broadcasting the at least one frame of image to the event detector and the another event detector.

7. The image arrangement method according to claim 3, further comprising:

activating the event detector in a container system.

8. The image arrangement method according to claim 1, further comprising:

decoding another video stream into at least one frame of another image;

buffering the at least one frame of another image in another message queue;

defining the another message queue as a second topic; and transmitting the at least one frame of another image in the another message queue according to another subscribed target of the second topic.

9. The image arrangement method according to claim 8, wherein the video stream and the another video stream respectively come from different image capturing devices.

10. The image arrangement method according to claim 1, wherein transmitting the at least one frame of image in the message queue according to the subscribed target of the first topic further comprises:

receiving a setting operation through a user interface; and adding or deleting the subscribed target of the first topic according to the setting operation.

11. An image processing system, comprising:

a memory, configured to store a program code; and a processor, coupled to the memory and configured to load the program code to execute:

decoding a video stream into at least one frame of image;

buffering the at least one frame of image in a message queue;

defining the message queue as a first topic, wherein the message queue queues the at least one frame of image and waits for a subscribed target to subscribe the first topic;

setting an event detector corresponding to the subscribed target of the first topic, and setting another event detector corresponding to the subscribed target of the first topic, wherein an event detected by the event detector is different from an event detected by the another event detector; and transmitting the at least one frame of image in the message queue to the event detector and the another event detector at the same time in response to the subscribed target subscribing the first topic.

12. The image processing system according to claim 11, wherein the processor further executes:

defining a decoder as a producer of the first topic, wherein the decoder is used to decode the video stream; and publishing the at least one frame of image converted from the video stream to the message queue.

13. The image processing system according to claim 11, wherein the processor further executes:

receiving the at least one frame of image in the message queue through the event detector; and detecting the event in image content of the at least one frame of image by the event detector.

14. The image processing system according to claim 13, wherein the processor further executes:

training the event detector by a machine learning algorithm, wherein the machine learning algorithm establishes an association between an input image and the event.

15. The image processing system according to claim 13, wherein the processor further executes:

receiving the at least one frame of image in the message queue through the another event detector.

16. The image processing system according to claim 15, wherein the processor further executes:

broadcasting the at least one frame of image to the event detector and the another event detector.

17. The image processing system according to claim 13, wherein the processor further executes:

activating the event detector in a container system.

18. The image processing system according to claim 11, wherein the processor further executes:

decoding another video stream into at least one frame of another image;

buffering the at least one frame of another image in another message queue;

defining the another message queue as a second topic; and transmitting the at least one frame of another image in the another message queue according to another subscribed target of the second topic.

19. The image processing system according to claim 18, wherein the video stream and the another video stream respectively come from different image capturing devices.

20. The image processing system according to claim 11, further comprising:

an input device, coupled to the processor and configured to receive a setting operation on a user interface, wherein the processor further executes:

adding or deleting the subscribed target of the first topic according to the setting operation.

* * * * *